(12) United States Patent
Ewers

(10) Patent No.: US 9,516,887 B1
(45) Date of Patent: Dec. 13, 2016

(54) HANDHELD SKINNING DEVICE WITH A SIMPLE BLADE REPLACEMENT

(71) Applicant: FREUND Maschinenfabrik GmbH & Co. KG, Paderborn (DE)

(72) Inventor: Christoph Ewers, Willebadessen (DE)

(73) Assignee: Freund Maschinenfabrik GmbH & Co. KG, Paderborn (DE)

( * ) Notice: Subject to any disclaimer, the term of this patent is extended or adjusted under 35 U.S.C. 154(b) by 0 days.

(21) Appl. No.: 15/185,775

(22) Filed: Jun. 17, 2016

(30) Foreign Application Priority Data

Jun. 17, 2015 (DE) .................... 20 2015 103 188 U

(51) Int. Cl.
  *A22B 5/00* (2006.01)
  *A22B 5/16* (2006.01)

(52) U.S. Cl.
  CPC ............... *A22B 5/168* (2013.01); *A22B 5/166* (2013.01)

(58) Field of Classification Search
  CPC ......... A22B 5/163; A22B 5/166; A22B 5/168; A22C 25/17; A22C 25/006
  USPC .......... 452/132, 133; 99/584, 595, 591, 588, 99/589; 83/870, 364, 360, 368
  See application file for complete search history.

(56) References Cited

U.S. PATENT DOCUMENTS

| | | | | |
|---|---|---|---|---|
| 3,742,841 A | * | 7/1973 | Beasley | A22C 17/12 99/589 |
| 4,186,461 A | * | 2/1980 | Leining | A22B 5/166 452/133 |
| 4,451,953 A | * | 6/1984 | Leining | A22B 5/166 452/130 |
| 4,631,780 A | * | 12/1986 | Leining | A22B 5/166 452/130 |
| 4,993,112 A | * | 2/1991 | Burnett | A22C 17/12 30/276 |
| 8,896,391 B2 | * | 11/2014 | du Toit | H01P 5/04 333/17.3 |
| 2005/0217119 A1 | * | 10/2005 | Rapp | A22B 5/165 30/276 |

FOREIGN PATENT DOCUMENTS

| | | |
|---|---|---|
| DE | 20 2013 100 978 U1 | 5/2013 |
| EP | 0 203 716 A2 | 12/1988 |
| ES | 1073370 U | 12/2010 |

* cited by examiner

*Primary Examiner* — Richard Price, Jr.
(74) *Attorney, Agent, or Firm* — Muncy, Geissler, Olds & Lowe, P.C.

(57) ABSTRACT

A handheld skinning device having a tooth roll, which is retained motor-driven in a housing with side arms and rotating about an axis, and having a blade which in an operating position is positioned with a gap parallel to the tooth roll and is retained in a blade mount, which is formed by side parts fixed to the side arms of the housing and a blade holder. The blade mount in the operating position is fixed in the side arms by releasable locking, and in an opened position of the blade mount the blade can be removed from the blade holder. The locking of the blade mount in the operating position occurs by two spring-loaded locking pins in the arms, which are releasable together via a disengaging plate and in the opened position the blade holder remains connected to the arms of the housing.

5 Claims, 2 Drawing Sheets

HANDHELD SKINNING DEVICE WITH A SIMPLE BLADE REPLACEMENT

This nonprovisional application claims priority under 35 U.S.C. §119(a) to German Patent Application No. 20 2015 103 188.2, which was filed in Germany on Jun. 17, 2015, and which is herein incorporated by reference.

BACKGROUND OF THE INVENTION

Field of the Invention

The present invention relates to a handheld skinning device having a tooth roll, which is retained motor-driven in a housing with side arms and rotating about an axis, and having a blade which in an operating position is positioned with a gap parallel to the tooth roll and is retained in a blade mount, which is formed by side parts, fixed to the side arms of the housing, and a blade holder, and the blade mount in the operating position is fixed in the side arms by releasable locking, and in an opened position of the blade mount the blade can be removed from the blade holder.

Description of the Background Art

In a meat cutting plant, the fat or rinds of the animal carcass are removed with use of a handheld skinning device. A handheld skinning device can also be used, however, to produce fine strips of meat, for instance, thin slices of ham or salmon.

The German utility model DE 202013 100 978 U1 describes a generic handheld skinning device. In said device, the blade can be changed in that two locking pins are unscrewed and the blade mount is then pivoted and the blade can be removed and reinserted.

A skinner device which has a tooth roll assembly and a parallel blade is known from European patent application EP 0 203 716 A2, which corresponds to U.S. Pat. No. 4,631,780. The blade mount has a complicated structure and when the blade mount is loosened to change the blade, the tooth roll assembly is also released for a replacement. As a result, the time expended for replacing a blade is relatively great.

A handheld skinning device with a tooth roll and a parallel blade is described in the Spanish application ES 1 073 370 U. A relatively simple blade mount is provided here. Loosening of a number of screws is provided, however, for replacing the blade. This makes the device unmanageable for daily use in a meat cutting plant.

The U.S. Pat. No. 4,451,953 describes a skinning device in which to change the blade, a locking bolt is unlocked and then the blade mount is pulled out of the housing and then the blade is replaced. However, parts of the device can be lost during the blade replacement. This is problematic in a slaughterhouse.

SUMMARY OF THE INVENTION

It is therefore an object of the invention to provide a generic handheld skinning device, which has a very simple structure and all parts of the blade mount remain together, and in which the blade replacement can occur with a simple handle without a tool.

In an exemplary embodiment, the handheld skinning device is provided with a tooth roll, which can be retained motor-driven in a housing with side arms and rotating about an axis. A blade in an operating position can be positioned substantially parallel to the tooth roll such that a gap results through which the detached meat material slides.

The blade is retained in a blade mount, which is formed from side parts fixed to the side arms of the housing and the blade holder. The blade mount in the operating position can be fixed in the side arms by releasable locking. In an opened position of the blade mount, the blade can be removed from the blade holder through the free space resulting after the pivoting.

The locking of the blade mount can be realized by, for example, two spring-loaded locking pins, which engage releasably through the side arms in the blade holder. The release of the blade mount occurs via a disengaging plate, by which both locking pins are raised at their heads and are thereby released together.

After the release, the blade holder in the opened position is connected further to the arms of the housing. No parts that could be lost are free or loose.

Advantageously, the blade mount is made pivotable about the axis of the tooth roll from the operating position to the opened position. In the opened position of the blade holder, the releasable locking pins are raised and the blade holder is pivoted about an opening angle. The blade mount is opened as a result and the blade can be removed or inserted. It can be replaced in a simple way. The opening angle is bounded by a blade holder stop on the housing.

The fixing of the locking pins in the closed position can occur via the engaging of the inner pin ends in a lock hole of the blade holder. They thereby hold the blade mount in the operating position and the blade is secured.

This design minimizes free spaces in which meat material could collect. In this form, the device is easy to clean.

The disengaging plate in the operating position is pressed via the heads of the spring-loaded locking pins as a guard plate on the housing. As a result, injury in the case of careless handling of the device is prevented.

When the locking pins are released, the disengaging plate is raised in the front on a grip edge and pivoted about a top edge, which is not connected to the housing. This is a simple design, which can also be cleaned easily.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
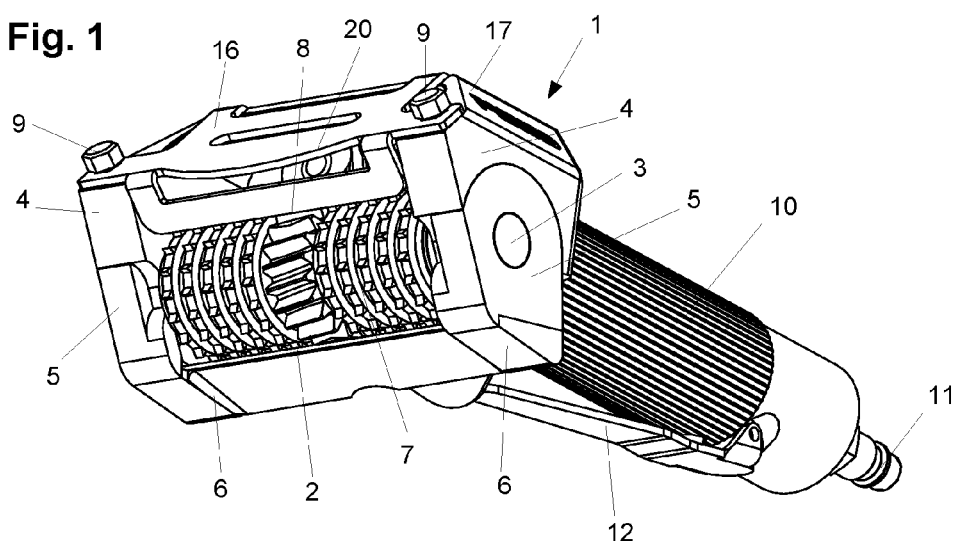
FIG. 1 shows an isometric view of a handheld skinning device according to an exemplary embodiment.

FIG. 1 shows an isometric view of handheld skinning device 1 with a view of blade 2 and tooth roll 7. Tooth roll 7 is driven by a motor in handle 10 via worm gear 8 after engaging lever 12 is pressed. Guard plate 16 offers protection from injury. Power is supplied to the motor via motor connection 11. The motor can be made as an electric, pneumatic, or hydraulic motor.

In the shown operating position, blade holder 6 and side parts 5 are fixed in side arms 4 of housing 17 in each case by a locking pin.

The blade mount includes its side parts 5 and blade holder 6. Blade 2 is retained in blade holder 6. The release of the locking pins occurs by raising their heads 9 by means of the disengaging plate 16. For this purpose, the plate is raised on front grip edge 20 and the blade mount is opened by its rotation about axis 3 in arms 4.

Figure 2:
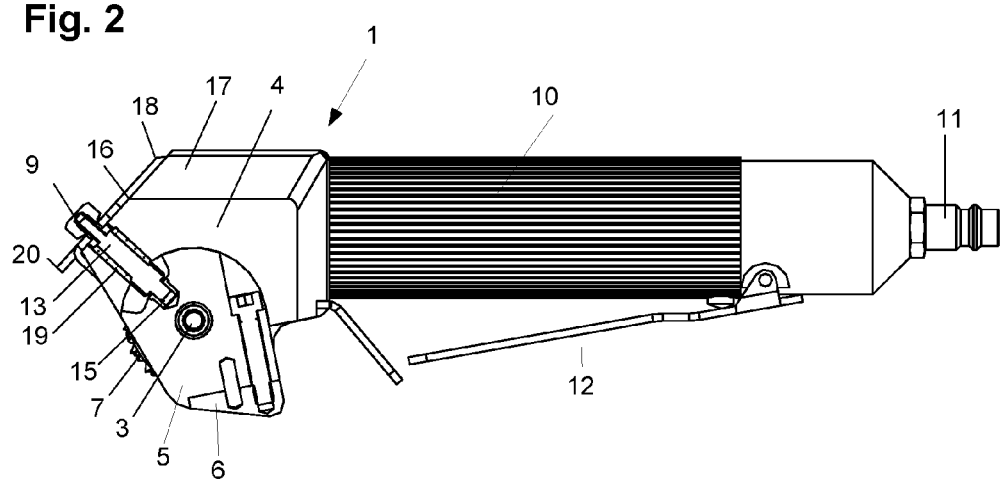
FIG. 2 shows a side sectional view through the handheld skinning device in a closed position.
Figure 3:
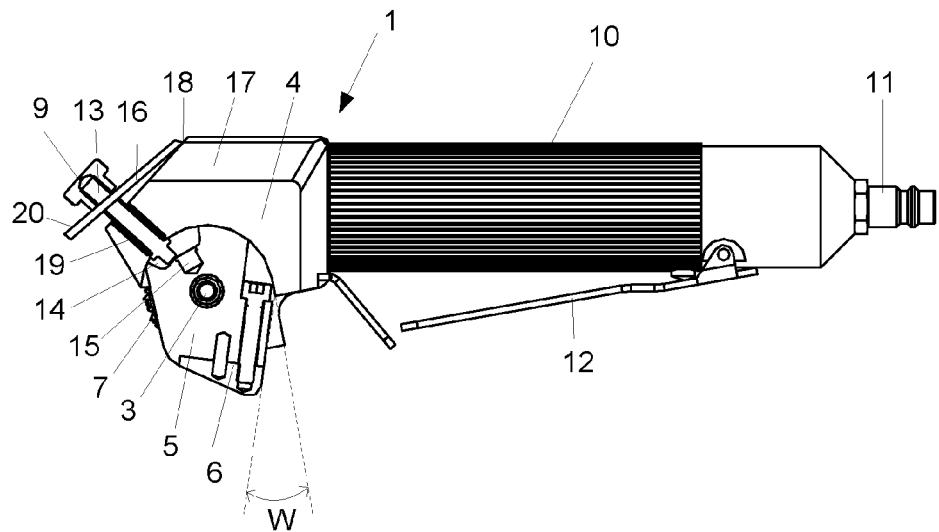
FIG. 3 shows a side sectional view through the handheld skinning device in an opened position.

Side views of handheld skinning device 1 with handle 10, connector 11, and engaging lever 12 are shown in FIG. 2 and FIG. 3. Side arm 4 of housing 17 is shown in a sectional view and with blade holder 6 and side part 5.

Blade holder 6 is held pivotable about axis 3 in side arm 4. Disengaging plate 16 is located between arms 4 and heads 9 of locking pins 13 and can be pivoted about top edge 18 lying opposite to grip edge 20.

Blade holder 6 is shown in the operating position in FIG. 2. Locking pin 13, retained via spring 19, engages in lock hole 15 and fixes the position.

Blade holder 6 is shown in the opened position in FIG. 3. Side parts 5 are pivoted about opening angle W. Locking pin 13 is raised by raising disengaging plate 16 and pivoting on edge 18 via head 9 against spring 15 and placed in recess 14. The stop for the pivoting movement is provided by the guiding of side part 5 in arm 4 of the housing.

Figure 4:
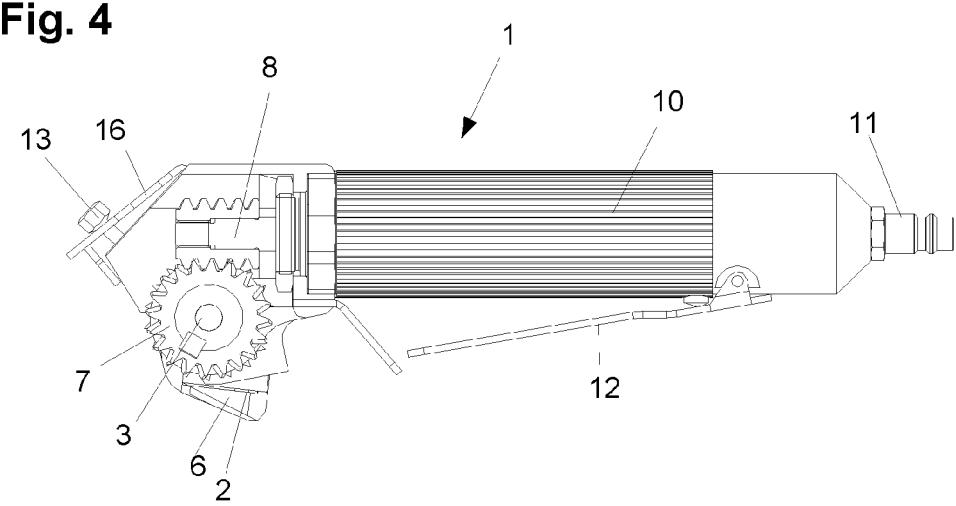
FIG. 4 shows a side sectional view through the tooth roll in the opened position.

FIG. 4 shows the handheld skinning device 1 in a similar view as in FIG. 3, only that in this case a sectional view through tooth roll 7 is shown, which is driven by worm gear 8 about axis 3. Blade 2 in blade mount 6 in the opened position shown here is accessible for replacement. To this end, locking pin 13 is raised via disengaging plate 16.

The free gap, which in the working position determines the thickness of the produced strip of meat, can also be seen here between blade 2 and tooth roll 7.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A handheld skinning device comprising:
    a housing with side arms;
    a tooth roll that is retained motor-driven in the housing, the tooth roll being rotatable about an axis; and
    a blade, which in an operating position, is positioned with a gap substantially parallel to the tooth roll and is retained in a blade mount, which is formed by side parts fixed to the side arms of the housing and formed by a blade holder,
    wherein the blade mount, in the operating position, is fixed to the side arms by releasable locking, and in an opened position of the blade mount, the blade is removable from the blade holder, and
    wherein the locking of the blade mount in the operating position occurs by two spring-loaded locking pins in the arms, which are releasable together via a disengaging plate and, in the opened position, the blade holder remains connected to the arms of the housing.

2. The handheld skinning device according to claim 1, wherein the locking pins in the operating position engage with their inner pin ends in a lock hole of the side part of the blade mount.

3. The handheld skinning device according to claim 1, wherein the blade mount is pivotable about the axis from the operating position to the opened position about an opening angle.

4. The handheld skinning device according to claim 3, wherein the disengaging plate in the operating position is pressed via heads of the spring-loaded locking pins as a guard plate on the housing.

5. The handheld skinning device according to claim 1, wherein the disengaging plate during release of the locking pins is pivoted about a top edge, which is not connected to the housing.

* * * * *